United States Patent [19]

Funada et al.

[11] 4,443,819

[45] Apr. 17, 1984

[54] LIQUID CRYSTAL DISPLAY SCREEN FOR USE IN TV

[75] Inventors: Fumiaki Funada, Yamatokoriyama; Toshiaki Takamatsu, Tenri; Tomio Wada, Nara, all of Japan

[73] Assignee: Sharp Kabushiki Kaisha, Osaka, Japan

[21] Appl. No.: 342,407

[22] Filed: Jan. 25, 1982

[30] Foreign Application Priority Data

Jan. 27, 1981 [JP] Japan ............................ 56-10633[U]

[51] Int. Cl.$^3$ ............................................. H04N 5/74
[52] U.S. Cl. .................................... 358/236; 358/250; 358/254; 340/784
[58] Field of Search ............... 358/230, 236, 241, 250, 358/254; 350/330, 345, 338, 337, 352; 340/784, 705, 795

[56] References Cited

U.S. PATENT DOCUMENTS 4,051,535 9/1977 Inglis .................................... 358/250

FOREIGN PATENT DOCUMENTS 55-124371 9/1980 Japan .................................... 358/236

OTHER PUBLICATIONS

IBM Technical Disclosure Bulletin, "Brightness Enhancement-Reflective Liquid Crystal Displays", vol. 16, No. 5, Oct. 1973.

Primary Examiner—Richard Murray
Attorney, Agent, or Firm—Birch, Stewart, Kolasch & Birch

[57] ABSTRACT

A liquid crystal display TV includes a TV housing, and a reflective type liquid crystal display panel installed in the housing. A magnifying lens is disposed for magnifying an image on the display area and a support assembly is provided for supporting the magnifying lens to allow a space where the ambient light enters from above a display area of said liquid crystal display panel when the magnifying lens lens is in use. This arrangement allows full utilization of the ambient light for the optical performance of the liquid crystal display panel.

10 Claims, 4 Drawing Figures

LIQUID CRYSTAL DISPLAY SCREEN FOR USE IN TV

BACKGROUND OF THE INVENTION

This invention relates to a liquid crystal display screen panel for use in TV receivers and more particularly it relates to a small-sized and compact TV screen of the reflective type having a magnifying lens for enlarging an image for the user's view.

With liquid crystal display panels and especially those carrying such non-linear elements as transistors on its substrates, an increased display area causes disadvantages in yield and material cost and difficulties in putting them into practical use. A reasonable size of a display screen is however preferable from the viewpoint of human engineering. A solution to this problem is disclosed in Japanese Laid-open publication No. 52/146988, wherein a magnifying lens or a convex lens is mounted directly on a surface of a liquid crystal display panel. Nevertheless, this approach is unsuccessful since focus distance is limited and an image becomes distorted particularly when the panel is used in TV's. It is also known that a CRT TV screen is often provided with a convex lens for magnifying a video image. Provided that this arrangement with a fixing frame serving also as a shielding hood is applied to a liquid crystal display panel of the reflective type, the ambient light fails to impings effectively on the display screen so that the screen becomes dark. Furthermore, the magnifying lens installed in association with the display screen impairs pocketability of compact TV's.

OBJECT AND SUMMARY OF THE INVENTION

With the foregoing in mind, it is an object of the present invention to provide a liquid crystal display panel for use in TV's by which a clear and definite image is viewable without distortion.

The above object is achieved by providing a liquid crystal display screen which comprises a housing, a reflective type liquid crystal display panel installed in said housing, an optical lens disposed for magnifying an image on the display area and a support assembly for supporting said optical lens to allow a space where the ambient light enters from above a display area of said liquid crystal display panel when said optical lens is in use. Preferably, the support assembly is designed to hold said optical lens in a foldable fashion and especially holding said optical lens in a folded position in said housing when said lens is not in use.

BRIEF DESCRIPTION OF THE DRAWINGS

Other objects and many of the attendant advantages of the present invention will be readily appreciated as the same becomes better understood by reference to the following detailed description when considered in conjunction with the accompanying drawings in which like reference numbers designate like parts throughout the figures thereof, and wherein.

DETAILED DESCRIPTION OF THE INVENTION

Figure 1:
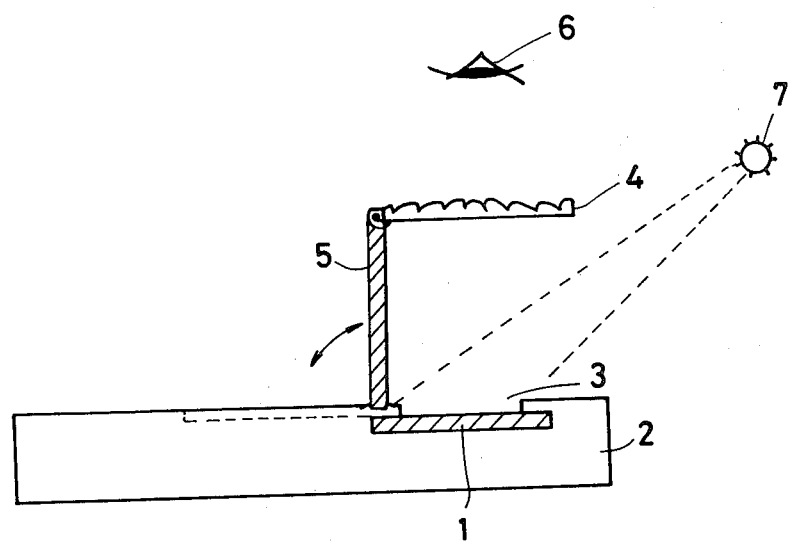
FIG. 1 is a schematic view of a liquid crystal display TV according to an embodiment of the present invention.
Figure 2:
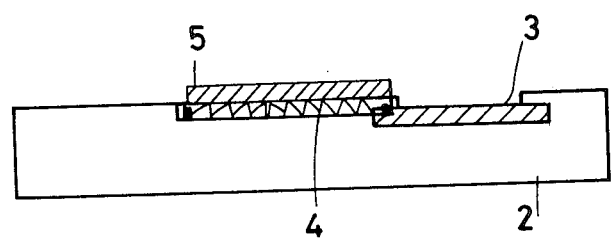
FIG. 2 is a schematic view illustrating a magnifying lens in a folded position in the liquid crystal display TV.

Referring to FIG. 1, there is illustrated a liquid crystal display TV constructed according to an embodiment of the present invention. The liquid crystal display TV includes a liquid crystal display panel 1 of the reflective type. There is disposed at a distance over a display area 3 of the LCD panel 1 a magnifying lens 4 which permits the ambient light to impinge directly on the display area 3 of the LCD panel 1. The magnifying lens 4 is hinged on the LCD TV 2 by means of a bar-like or plate-like arm 5. The viewer is designated 6 and a souce of light is designated 7. The support arm 5 is of a foldable construction by which the magnifying lens 4 and the support arm 5 are housed into the body of the LCD TV 2 as shown in FIG. 2 when the TV is not in use and is put into the user's pocket. A transparent plate of plastic or the like may be used instead of the bar-like support arm 5 to fix the whole of the magnifying lens 4 without shutting off the ambient light. It is noted that the magnifying lens 4 may be set up by a convex lens or a Fresnel lens. The Fresnel lens is more desirable when the display screen 3 is of a size of 1" or longer. It is preferable that magnification of the magnifying lens 4 range from 1.3 to 3. Too much magnification is not suitable for practical use.

Any well known mode of the liquid crystal display panel 1 applicable for the purpose of the present invention, e.g., the twisted nematic mode, the dynamic scattering mode, the guest host mode and the phase shift mode. Furthermore, any conventional driving scheme such as the voltage averaging method is available and the LCD panel may be driven by switching elements such as silicon MOS transistors, thin film transistors (TFT) and varistors formed on a substrate of the LCD panel.

Figure 3:
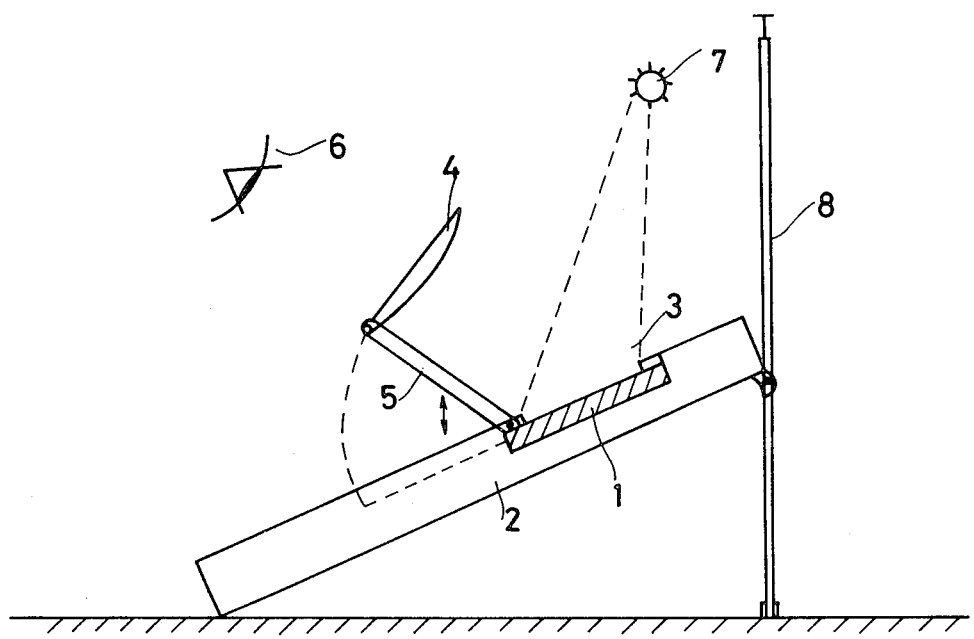
FIGS. 3 and 4 are schematic views of other embodiments of the present invention.

For the LCD panel of the twisted nematic mode, the optical axis of the lens may be positioned into alignment with the best viewing angle out of the normal line of the liquid crystal substrate. FIG. 3 illustrates in schematic view another embodiment of the present invention incorporating such concept. In a manner similar to the embodiment of FIG. 1, the magnifying lens 4 is supported movably over the display area 3 of the LCD panel by means of the support arm 5. The LCD TV body 1 secured by a rod antenna 5 is adjustable in inclination and in other words viewing angle. The viewer 6 may view the display area 3 of the LCD panel along an oblique direction. The rod antenna 8 is rotatable with respect to the body through the use of a hing provided at the bottom of the body and, when being not in use, may be seated on the bottom of the body by means of a rod expansion device. It is possible to bring the optical axis of the magnifying lens 4 into alignment with the best viewing angle because it falls somewhat out of the normal line of the display area of the LCD panel.

Figure 4:
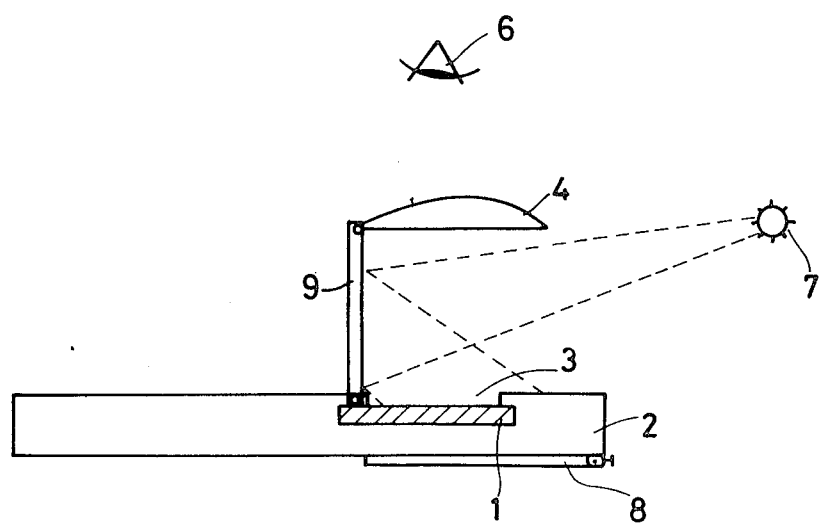

FIG. 4 depicts still another embodiment of the LCD TV wherein the magnifying lens 4 disposed over the display area 3 of the LCD TV 2 is held movable through the use of s plate-like reflector having a light reflective surface. Light from the light source 7 is reflected from the reflector 9 as well as impinging directly on the display area 3. Since the reflected light also lightens the display area 3, a higher degree of contrast is ensured. In this embodiment, the rod antenna 8 is seated on the bottom of the main body of the LCD TV 2.

As noted earlier, the liquid crystal display device according to the present invention is adapted such that the image-magnifying lens is spaced apart from rather than being mounted directly onto the display area. It is therefore possible to use a lens of a relatively long focus distance while preventing distortion of an image due to aberration. The ambient light may impinge directly on the display area without penetrating the magnifying lens and lightens the display area. The display area is well-lighted and easy-to-read. The magnifying lens which is collapsible into the main body improves compactness and pocketability of liquid crystal display TVs.

Whereas the present invention has been described with respect to specific embodiments thereof, it will be understood that various changes and modifications will be suggested to one skilled in the art, and it is intended to encompass such changes and modifications as fall within the scope of the appended claims.

What is claimed is:

1. A liquid crystal display device comprising:
   a housing;
   a liquid crystal display panel mounted in said housing and producing a display image;
   an optical lens magnifying said display image;
   a support arm having said lens pivotially mounted on one end thereof and being pivatally mounted on said housing at the other end thereof, said support arm supporting said lens spaced apart from said display panel in a display mode and folding to place said lens in juxtaposition with said housing in a retracted mode.

2. The device of claim 1 wherein said lens is juxtaposed between said housing and said support arm when in the retracted mode to thereby protect said lens.

3. The device of claim 1 wherein said liquid crystl display panel is of the reflective type.

4. The device of claim 3 wherein said support arm has substantially the same width as said optical lens.

5. The device of claim 1 wherein said support arm is transparent.

6. The device of claim 5 wherein said support arm has substantially the same width as said optical lens.

7. The device of claim 1 wherein said support arm has an inner surface closest said display panel when in said display mode, said inner surface being reflective.

8. The device of claim 1 further comprising:
   telescopic antenna means for receiving a television signal and controlling the angle of inclination of said housing with respect to a support surface,
   said antenna being pivotally mounted to said housing and telescopically shortened to fold into juxtaposition with said housing when said device is in a retracted mode.

9. The device of claim 1 wherein said support arm has substantially the same width as said optical lens.

10. A liquid crystal display device comprising:
    a housing;
    a liquid crystal display panel mounted in said housing and producing a display image;
    an optical lens magnifying said display image to produce an image directly viewable by the user;
    means for supporting said optical lens at a distance from said display panel to enable magnification of said image, said support means retracting to move said lens into juxtaposition with said housing to facilitate compact storage of said device.

* * * * *